United States Patent [19]

Panigati

[11] 4,075,935

[45] Feb. 28, 1978

[54] PISTON FOR PRESSURE FLUID OPERATED CYLINDERS

[76] Inventor: Pier Luigi Panigati, Via Friuli, 64, Milan, Italy, 20135

[21] Appl. No.: 578,565

[22] Filed: May 19, 1975

Related U.S. Application Data

[63] Continuation-in-part of Ser. No. 345,032, Mar. 26, 1973, abandoned.

[30] Foreign Application Priority Data

Mar. 30, 1972 Italy .................................. 22626/72

[51] Int. Cl.² ............................ F16J 1/02; F16J 1/12
[52] U.S. Cl. ........................................ 92/243; 92/249
[58] Field of Search ................. 92/243, 249, 240, 248

[56] References Cited

U.S. PATENT DOCUMENTS

| | | | |
|---|---|---|---|
| 1,828,056 | 10/1931 | Lamb | 92/243 X |
| 2,895,773 | 7/1959 | McConnaughey | 92/249 X |
| 3,136,228 | 6/1964 | Dailey | 92/249 X |
| 3,176,595 | 4/1965 | Schwartz | 92/243 |
| 3,563,557 | 2/1971 | Doutt | 92/243 X |
| 3,605,553 | 9/1971 | Panigati | 92/249 X |
| 3,745,890 | 7/1973 | Costarella | 92/243 X |

*Primary Examiner*—Irwin C. Cohen
*Attorney, Agent, or Firm*—Guido Modiano; Albert Josif

[57] ABSTRACT

A piston for pressure fluid cylinders which comprises, fixed on the piston rod, a disc member and a sleeve-like body of elastic material associated with said disc member. The sleeve-like body has an outwardly projecting annular lip, limited by an annular substantially frontal slit. The annular lip engages the cylinder liner, thereby providing the sealing action.

2 Claims, 2 Drawing Figures

PISTON FOR PRESSURE FLUID OPERATED CYLINDERS

CROSS-REFERENCE TO RELATED APPLICATIONS

This is a continuation-in-part of my application Ser. No. 345,032, filed on Mar. 26, 1973 and now abandoned.

BACKGROUND OF THE INVENTION

This invention relates to a piston for pressure fluid operated cylinders.

In my U.S. Pat. No. 3,605,553 a piston for pressure fluid operated cylinders has been disclosed, comprising fixed on the piston rod a disc member having a diameter substantially smaller than the inner diameter of the cylinder chamber and a sleeve-like member of elastic material projecting peripherally and laterally with respect to both sides of said disc member connected therewith. Said sleeve-like member engages at the end portions thereof the cylinder chamber, a reduced diameter intermediate zone being provided in said sleeve like-member, the respective end portions of the sleeve-like member penetrating alternatively, at the end of stroke positions in a respective annular seat forming therewith a damping chamber.

In the practical use of the above described piston it has been observed that, owing to the fact that the piston had to be forced into the cylinder chamber in order to obtain the required sealing, at the start of operation, after a resting period, a rather relevant starting friction developed between the piston and the cylinder chamber, with the consequent irregularity in the operation and difficulties during the starting stage.

SUMMARY OF THE INVENTION

The main object of this invention is to remove as far as possible the above mentioned drawbacks, by providing a piston for pressure fluid operated cylinders with which the starting friction is remarkably reduced and which is capable of functioning for a long time also under high pressure conditions, with durably efficient sealing action and rational division of the internal stresses.

Another important object of the invention is to provide a piston capable to be easily manufactured at an economically satisfactory cost.

These and other objects are attained by a piston for pressure fluid cylinders which comprises, a piston rod, a disc member fixed thereon and a sleeve-like body of elastic material mounted on said disc member and defining the piston head, said sleeve-like body having a central zone with an inner and outer peripheral surface, a circumferential notch on the inner periphery of said central zone adapted to receive the peripheral portion of said disc member, said inner peripheral surface of said central zone and said circumferential notch having, in disassembled condition thereof, a diameter substantially smaller than the diameter of said disc member, said sleeve-like body having at least at one end portion thereof a circumferential bead-like formation and a frontal end surface extending transverse to said piston rod, a circumferential longitudinally extending slot in said frontal surface, a flexible peripheral lip in said bead formation, the thickness and length of said flexible peripheral lip being defined by said slot, said flexible lip having in mounted condition of said piston head an external peripheral end portion having a circumferential outer diameter smaller than the circumferential outer diameter of the corresponding bead formation.

BRIEF DESCRIPTION OF THE DRAWINGS

Further characteristics and advantages of the invention will appear more fully from the detailed description of a preferred, but not exclusive embodiment, of a piston for pressure fluid operated cylinders, according to the invention, shown by way of a non-limiting example in the accompanying drawing in which.

DESCRIPTION OF A PREFERRED EMBODIMENT

Figure 1:
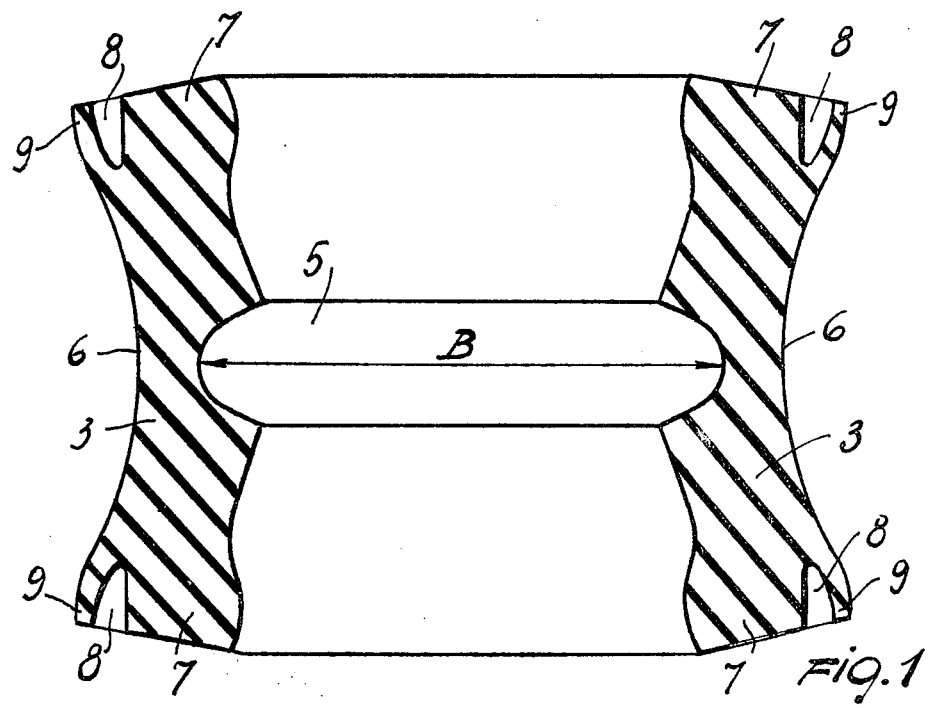
FIG. 1 is an axial section of the elastic sleeve-like body of the piston in the disassembled condition.

With reference to the drawing the piston comprises a metallic disc member 1 fixed, for example by welding, on a piston rod 2 of a pressure fluid operated cylinder and a piston head forming member 3 of elastic material, for example rubber, having the shape of a sleeve open at both ends thereof to be put on said disc member 1. The latter has a diameter which is substantially smaller than the inner diameter of the cylinder liner 4.

The rubber member 3 projects or over hangs laterally from both sides of the disc 1, owing to the fact that it is in the form of a substantially cylindrical sleeve having a central zone with an inner and outer peripheral surface, the inner surface having a circumferential notch 5 (FIG. 1) within which a peripheral suitably shaped rim of the disc 1 may be inserted.

Figure 2:
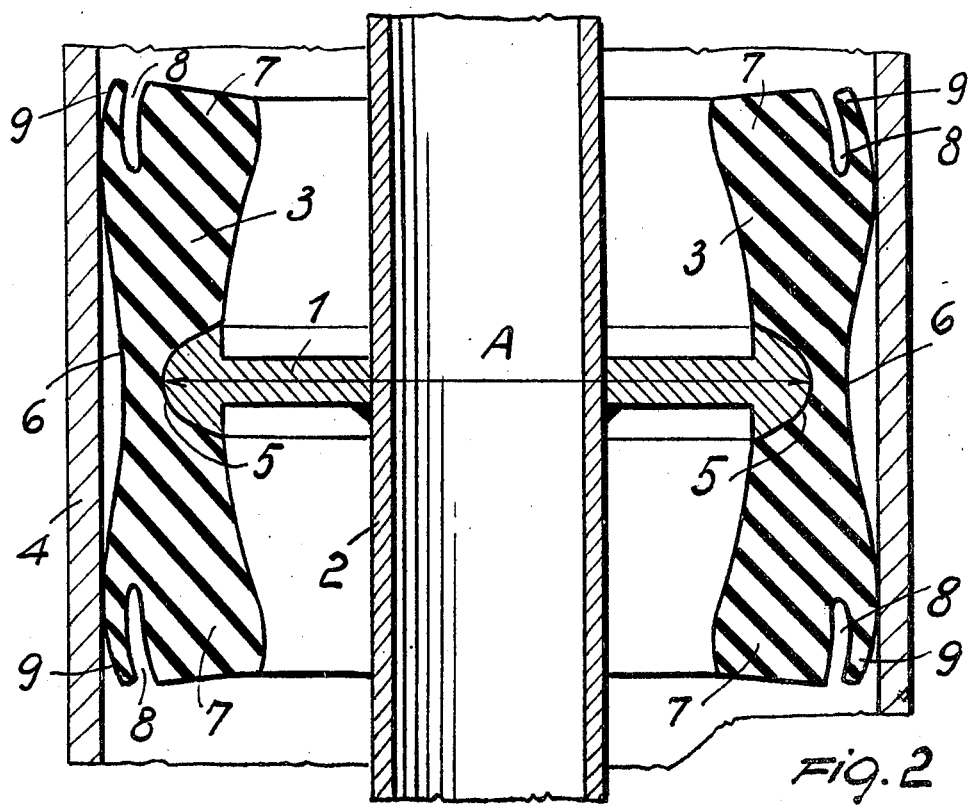
FIG. 2 shows an axial section of the piston arranged within a cylinder.

As clearly visible from FIG. 1, the diameter B of the circumferential notch 5 and that of the inner peripheral surface in disassembled condition of the sleeve-like body 3 are substantially smaller than the diameter of disc 1, so that a stretching of the central zone of the sleeve-like body takes place during the mounting operation so that the sleeve-like body takes up the saddle-like shape shown in FIG. 2. The sleeve-like body 3 has in a central zone thereof a depression 6 having, in disassembled condition shown in FIG. 1, an inwardly convex and outwardly concave shaped surface extending into bead-like portions 7 which have a greater thickness than the remaining portions and having rounded-up lateral surfaces. Each bead-like formation 7 is provided in the frontal end surface thereof, which extends transverse to the piston rod, with an annular slot 8 which extends longitudinally near the external periphery surface of the body 3, so as to determine a flexible annular lip 9 capable to sealingly engage the inner surface of the cylinder liner 4. The thickness and length of the flexible peripheral lip 9 are defined by the position and length of the slot 8.

As shown in the drawings, the thickness of the lips 9 is substantially uniform throughout the length thereof and is substantially smaller than the thickness of the wall of the sleeve-like body so that the deformation of the lips is pressure responsive and independent of the main sleeve-body wall 3.

The sleeve-like body 3 is mounted on the disc 1 by pulling it simply thereover so that the peripheral rim of said disc 1 is inserted in the peripheral notch 5. After the mounting, the lips 9 are urged against the inner surface of the cylinder liner 4 at two annular zones which limit an intermediate depressed zone at the portion 6 of the member 3. Owing to the fact that the diameter B of the peripheral notch 5 is effectively smaller than the diameter A of disc 1, the elastic body 3, after the disc 1 has been pulled over, is deformed and assumes substantially the saddle-like shape shown in FIG. 2. In these conditions the peripheral end portions of the flexible lips 9 have a circumferential outer diameter smaller than the circumferential outer diameter of the corresponding bed formation. The outer end portions of the lips 9 do therefore not touch the cylinder liner 4, so avoiding the scraping of the lubricating oil but forming, as clearly visible from FIG. 2, an in-take taper between themselves and the cylinder lines 4 which favours the entrance of the oil with the consequent formation and maintenance of of the lubricating film.

In this way the disadvantages of known pistons are overcome, which have lips which remain in contact with their front or rear edges, with the inner liner of the cylinder and so during operation scrape away the lubricating film on the cylinder liner and thus cause the piston to operate in very critical conditions due to unsatisfied lubrication.

It will be understood from the foregoing that the term "effectively smaller" as indicated above should be intended in the sense that the difference between the diameters A and B should be selected so that the described effect i.e. the described deformation of the elastic body 3, is obtained. It will be thus understood that the term "effectively" indicates also a dimensional degree for a person skilled in the art allowing to ascertain how much smaller the diameter B of the notch 5 should be.

The operation of the described piston is as follows.

Owing to the fact that the sealing action between the piston and the cylinder is determined prevailingly by the engagement of the outer rounded portion of the flexible lips 9, the starting friction is remarkably lower as compared to the one which occurred with the piston of my above mentioned earlier patent.

Furthermore, the existence of annular slits 8 makes it possible to obtain always a perfect sealing, even under very high pressure conditions, by virtue of the so called, "self-charging" or self-swelling at the lips 9, which are urged against the cylinder liner 4 by the pressure acting on the piston head. However, the outer end portions of the lips 9 always maintain a slight intake configuration, thus in any case avoiding scraping of the lubricating oil.

It has further been found that, owing to the radially stretched condition of the sleeve-like member 3 when mounted on the disc 1, the constructive irregularities of the component parts of the piston are automatically compensated and overcome by the sleeve-like body of the described shape, which deforms so as to constantly maintain a satisfactory sealing action between the peripheral lips 9 and the inner surface of the cylinder liner 4. It has also been found that in this way, even if a substantial offset positioning of the piston rod with respect to the sleeve-like member 3 or with respect to the cylinder liner 4 occurs owing to possible constructional or operational irregularities, the sleeve-like member 3 will automatically deform in such a way as to maintain the above mentioned satisfactory sealing action. The same considerations apply in the case of transverse or radial forces which may temporarily act on the piston. In fact, these radial stresses may force the piston assembly to become offset with respect to the normal center line position of the piston assembly. In normal constructions, owing to such offset position, the surface of the sleeve member opposite to the side towards which the offset action is exerted, would completely detach from the cylinder liner and the piston action would be lost. Owing to the lips provided by the sleeve member 3 of the piston, lips 9 on the side opposite to the side towards which the offset positioning occurred still remain in contact with the cylinder liner 4 without losing the piston sealing action.

With the arrangement according to this invention the piston may be inserted into the cylinder chamber with a slight forcing action or driving action or pressing action, since the sealing is ensured by the flexibility of the lips 9.

The friction between the piston and the cylinder may therefore be reduced to a minimum with a great advantage in respect to the life-time and the operational regularity.

The so devised invention is subject to numerous modifications and variants within the scope of the invention. For example, the bead-like formations may be provided only at one end of the body 3.

In practice the material used as well as the sizes selected may vary within the requirements limits.

I claim:

1. A piston for pressure fluid cylinders which comprises, a piston rod, a disc member fixed thereon and a sleeve-like body of elastic material open at both ends thereof and mounted on said disc member to overhang from both sides thereof and defining the piston head, said sleeve-like body having a central zone with an inner and outer peripheral surface, a circumferential notch on the inner periphery of said central zone for receiving the peripheral portion of said disc member, said inner peripheral surface of said central zone and said circumferential notch having, in disassembled condition thereof, a diameter effectively smaller than the diameter of said disc member, said sleeve-like body having at each end portion thereof a circumferential bead-like formation and a frontal end surface extending transverse to said piston rod, a circumferential longitudinally extending slot in said frontal surface, a flexible peripheral lip in said bead formation, the thickness and length of said flexible peripheral lip being defined by said slot, the difference between the size of the diameter of said circumferential notch in disassembled condition and the size of the diameter of said disc causing upon the mounting of said sleeve-like body on said disc member a pretensioning and a deformation of said sleeve member such that said flexible lip has in mounted condition of said piston head an external peripheral end portion having a circumferential outer diameter smaller than the circumferential outer diameter of the corresponding bead formation and wherein said outer peripheral surface is outwardly concave and defines together with said bead formations a saddle-like configuration of the outer peripheral surface of said piston head, thereby allowing an offset positioning of said sleeve-like body with respect to said cylinder without detachment thereof from the cylinder inner wall at the side opposite to the side towards which the offsetting occurs.

2. A piston according to claim 1, wherein the thickness of said lip is uniform throughout a prevailing length portion thereof and is substantially smaller than the thickness of the wall of said sleeve-like body, thereby to allow a pressure responsive deformation of said lips independent of said sleeve-like body wall.

* * * * *